(12) United States Patent
Lee et al.

(10) Patent No.: US 9,776,539 B2
(45) Date of Patent: Oct. 3, 2017

(54) SLIDING ARMREST DEVICE FOR VEHICLE

(71) Applicants: Hyundai Motor Company, Seoul (KR); Kia Motors Corporation, Seoul (KR); Daejoo Precision Industrial Co., Ltd., Hwaseong-si (KR)

(72) Inventors: Kwan Bo Lee, Seoul (KR); Jung Yoon Jang, Incheon (KR); Byung Jun Cho, Hwaseong-si (KR)

(73) Assignees: Hyundai Motor Company, Seoul (KR); Kia Motors Corporation, Seoul (KR); Daejoo Precision Industrial Co., Ltd., Hwaseong-si (KR)

( * ) Notice: Subject to any disclaimer, the term of this patent is extended or adjusted under 35 U.S.C. 154(b) by 24 days.

(21) Appl. No.: 14/949,682

(22) Filed: Nov. 23, 2015

(65) Prior Publication Data
US 2016/0297335 A1   Oct. 13, 2016

(30) Foreign Application Priority Data

Apr. 13, 2015   (KR) ......................... 10-2015-0051491

(51) Int. Cl.
*B60N 2/46*   (2006.01)

(52) U.S. Cl.
CPC ................................. *B60N 2/4646* (2013.01)

(58) Field of Classification Search
CPC . B64D 11/0644; B60N 2/4626; B60N 2/4646
USPC ...... 297/411.35, 411.2, 644.1, 344.1, 411.37
See application file for complete search history.

(56) References Cited

U.S. PATENT DOCUMENTS

| | | | | |
|---|---|---|---|---|
| 4,828,214 A | * | 5/1989 | Kanai ................... | B60N 2/071 248/420 |
| 6,874,747 B2 | * | 4/2005 | Oh ........................ | B60N 2/0705 248/424 |
| 6,948,775 B2 | * | 9/2005 | Tsai ........................ | A47C 1/03 297/411.2 |
| 6,957,866 B1 | * | 10/2005 | Cai .......................... | A47C 1/03 297/411.35 |
| 7,669,826 B2 | * | 3/2010 | Hayakawa ........... | B60N 2/0705 248/429 |
| 7,758,008 B2 | * | 7/2010 | Kojima ................ | B60N 2/0818 248/429 |
| 7,766,408 B2 | * | 8/2010 | Lota ..................... | B60N 2/4606 296/24.34 |

(Continued)

FOREIGN PATENT DOCUMENTS

| | | |
|---|---|---|
| CN | 202399962 U | 8/2012 |
| JP | 5-215120 A | 8/1993 |

(Continued)

*Primary Examiner* — Jose V Chen
(74) *Attorney, Agent, or Firm* — Morgan Lewis & Bockius LLP

(57) ABSTRACT

A sliding armrest device for a vehicle may include a fixed armrest having a first oblique mounting surface formed on a top surface thereof and inclining along a width direction of a vehicle body, a sliding armrest having a second oblique mounting surface formed on an undersurface thereof and vertically matching the first oblique mounting surface, and a sliding rail device disposed between the first oblique mounting surface of the fixed armrest and the second oblique mounting surface of the sliding armrest and providing a forward and backward sliding force for the sliding armrest.

10 Claims, 8 Drawing Sheets

(56) References Cited

U.S. PATENT DOCUMENTS

| | | | | |
|---|---|---|---|---|
| 8,052,111 B2* | 11/2011 | Bernhardt | ............ | B60N 2/0715 248/429 |
| 8,196,888 B2* | 6/2012 | Yamada | ............... | B60N 2/0705 248/423 |
| 8,585,150 B2* | 11/2013 | von Rothkirch und Panthen | ............... | B60N 2/4646 297/411.21 |
| 2002/0089217 A1* | 7/2002 | Scheerhorn | .......... | B60N 2/4646 297/188.19 |
| 2003/0030317 A1* | 2/2003 | Chen | ........................ | A47C 1/03 297/411.35 |
| 2005/0189807 A1* | 9/2005 | Norman | ................... | A47C 1/03 297/411.35 |
| 2007/0114829 A1* | 5/2007 | P. Wieczorek | ....... | B60N 2/4646 297/411.35 |
| 2007/0176449 A1* | 8/2007 | Kukucka | ............. | B60N 2/4646 296/24.34 |
| 2007/0262632 A1 | 11/2007 | Cody et al. | | |
| 2010/0008606 A1* | 1/2010 | Craddock | .............. | B60N 2/443 384/26 |
| 2010/0164341 A1* | 7/2010 | Craddock | ............ | A47B 88/493 312/334.11 |
| 2011/0169288 A1* | 7/2011 | Schreurs | .............. | B60N 2/4646 296/1.09 |
| 2013/0062899 A1* | 3/2013 | Stoia | .................... | B60N 2/4646 296/24.34 |
| 2013/0287330 A1 | 10/2013 | Ikeda | | |
| 2013/0341983 A1* | 12/2013 | Kimura | ................ | B60N 2/0705 297/344.1 |
| 2015/0069807 A1* | 3/2015 | Kienke | ................ | B60N 2/0232 297/344.1 |

FOREIGN PATENT DOCUMENTS

| | | |
|---|---|---|
| JP | 6-27279 U | 4/1994 |
| JP | 11-351247 A | 12/1999 |
| JP | 2001-182744 A | 7/2001 |
| KR | 10-2008-0037290 A | 4/2008 |

* cited by examiner

[ TOP VIEW ]

[ BOTTOM VIEW ]

SLIDING ARMREST DEVICE FOR VEHICLE

CROSS-REFERENCE TO RELATED APPLICATION

The present application claims priority to Korean Patent Application No. 10-2015-0051491 filed Apr. 13, 2015, the entire contents of which is incorporated herein for all purposes by this reference.

BACKGROUND OF THE INVENTION

Field of the Invention

The present invention relates to a sliding armrest device for a vehicle. More particularly, the present invention relates to a sliding armrest device for a vehicle, which enables a stable sliding motion of an armrest using a structure in which a pair of sliding rail devices is obliquely arranged along the width direction of a vehicle body.

Description of Related Art

Generally, a console box is disposed between a driver's seat and a passenger's seat of a vehicle so as to store various kinds of objects, and an armrest that supports the arm is mounted in an openable/closeable manner onto the upper part of the console box.

However, when a driver has a small body type and adjusts the seat toward the front side, the driver's arm is located at the front of the armrest, making it difficult for a driver to place his/her arm on the armrest.

In order to overcome this limitation, a sliding armrest that can slide to the front side and change in location is being applied to some kinds of vehicles.

FIG. 1 is a view illustrating a typical sliding armrest.

In FIG. 1, the reference numeral 1 denotes an armrest body and the reference numeral 2 denotes a rail.

A sliding end is integrally formed at both end portions of the armrest body 1, and the sliding end 3 is slidably inserted into the rail 2.

The sliding end 3 and the rail 2 are manufactured using plastic injection or metal die casting, and match so as to make line contact with each other.

In this case, as the sliding end 3 and the rail 2 are arranged parallel to the width direction of a vehicle body and make line contact with each other, there is a limitation in that the frictional force increases or the floating easily occurs in accordance with the flatness of the mutual friction surface and the tolerance between two parts. Also, since floating occurs due to an external force or since a force is not uniform or too large during the sliding, the emotional quality may be reduced.

Also, as the sliding end 3 is protrusively formed on both side portions of the armrest body 1, and furthermore as the rail 2 is located outside the sliding end 3, the whole horizontal width of the armrest becomes widened, making the configuration of the layout disadvantageous.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sliding armrest device for a vehicle, which can reduce a frictional force during the movement of a sliding armrest and simultaneously prevent a floating phenomenon in up-and-down and left-and-right directions, by including a fixed armrest mounted in an openable/closeable manner onto a console box and a sliding armrest mounted onto the fixed armrest so as to slide forward and backward and mounting a pair of sliding rail devices between the fixed armrest and the sliding armrest in an oblique form along the width direction of a vehicle body.

According to various aspects of the present invention, a sliding armrest device for a vehicle may include a fixed armrest having a first oblique mounting surface formed on a top surface thereof and inclining along a width direction of a vehicle body, a sliding armrest having a second oblique mounting surface formed on an undersurface thereof and vertically matching the first oblique mounting surface, and a sliding rail device disposed between the first oblique mounting surface of the fixed armrest and the second oblique mounting surface of the sliding armrest and providing a forward and backward sliding force for the sliding armrest.

The sliding rail device may include a fixed rail adhered closely to the first oblique mounting surface of the fixed armrest and fixedly mounted onto the first oblique mounting surface, a moving rail fixedly mounted onto the second oblique mounting surface of the sliding armrest and simultaneously disposed so as to be transferred along the fixed rail, a retainer disposed between the fixed rail and the moving rail and having a plurality of ball holding apertures formed in both end portions thereof, and a plurality of balls penetratively inserted into the ball holding apertures of the retainer and simultaneously disposed to roll between the fixed rail and the moving rail so as to provide a sliding transfer force for the moving rail with respect to the fixed rail.

The fixed rail may include an elastic pressurization end bent at both end portions thereof and covering an outer side surface of the ball.

The moving rail may include an elastic support end bent at both end portions thereof and covering an inner side surface of the ball.

In order to fix the fixed rail of the sliding rail device to the first oblique mounting surface of the fixed armrest, first assembly apertures for screw coupling may be formed in the fixed rail and the first oblique mounting surface.

In order to fix the moving rail of the sliding rail device to the second oblique mounting surface of the sliding armrest, a tool insertion aperture may be penetratively formed in the first oblique mounting surface and the fixed rail such that a tool is inserted into the tool insertion aperture from an undersurface of the fixed armrest, and a second assembly aperture for screw coupling may be formed in the moving rail and the second oblique mounting surface so as to match the tool insertion aperture.

The sliding armrest device may further include comprising an armrest locking mechanism installation space that is concave and is formed between second oblique mounting surfaces of the sliding armrest.

The sliding armrest device may further include an armrest cover member disposed over the sliding armrest and forming an armrest surface.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
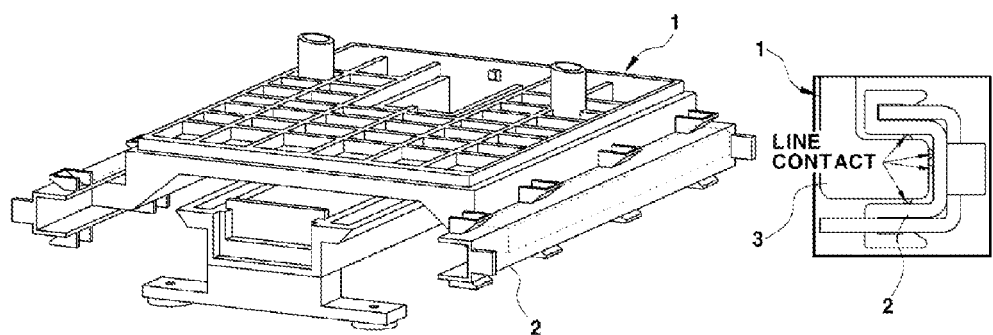
FIG. 1 is a view illustrating a typical sliding armrest according to the related art.
Figure 2:
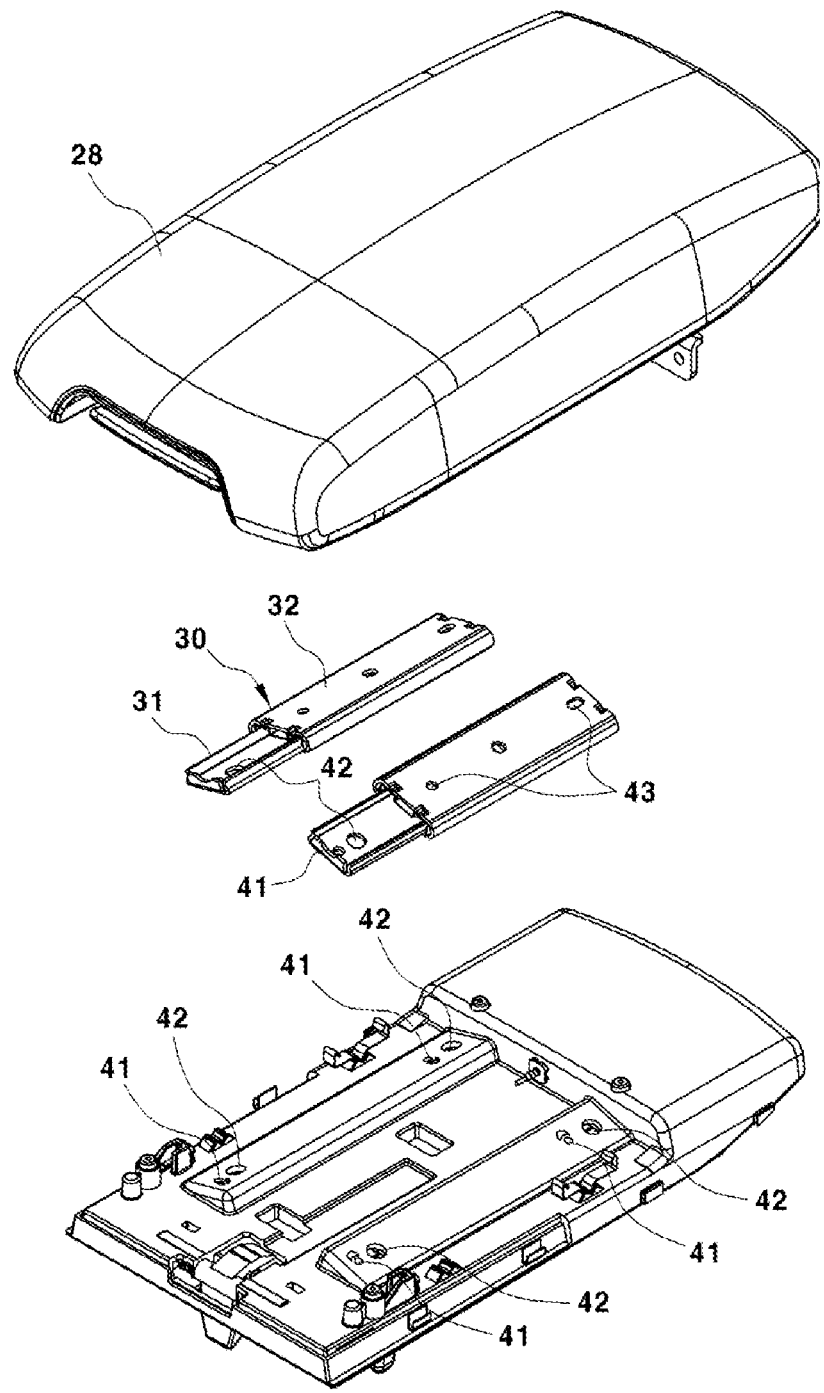
FIG. 2, FIG. 3A and FIG. 3B are perspective views illustrating an exemplary sliding armrest device according to the present invention.
Figure 3A:
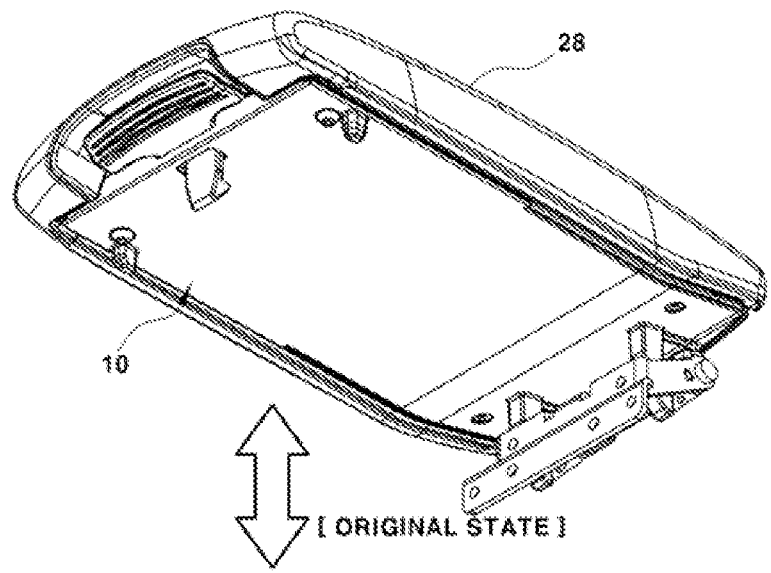
Figure 3B:
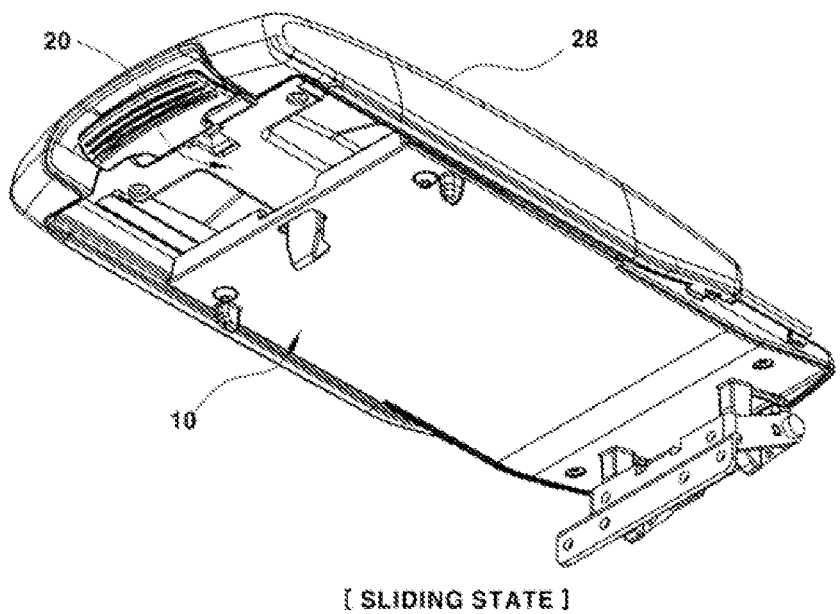
Figure 4:
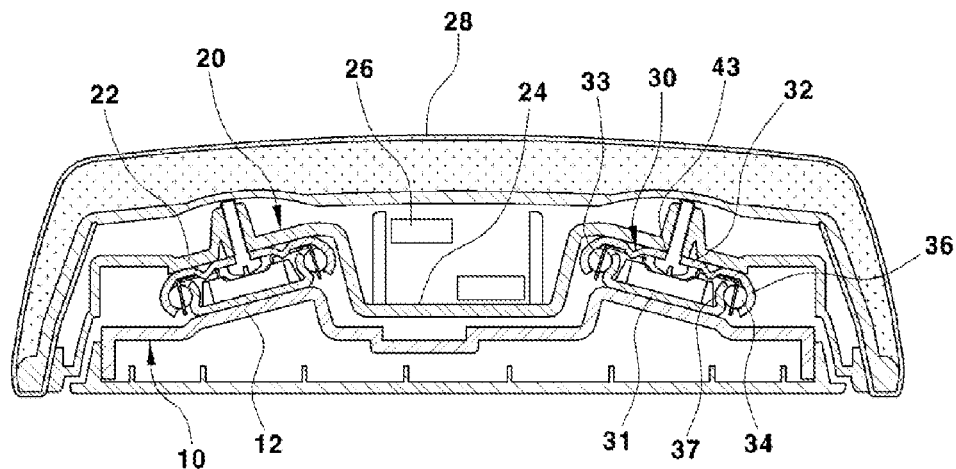
FIG. 4 is a cross-sectional view illustrating the exemplary sliding armrest device according to the present invention.

FIGS. 2, 3A and 3B are perspective views illustrating a sliding armrest device according to various embodiments of the present invention, and FIG. 4 is a cross-sectional view illustrating a sliding armrest device according to various embodiments of the present invention.

In FIGS. 2 to 4, the reference numeral 10 denotes a fixed armrest, and the reference numeral 20 denotes a sliding armrest.

The fixed armrest 10 may be mounted in an openable/closeable manner onto a console box (not shown) by a hinge device, and may have one pair of first oblique mounting surfaces 12 protruding on the top surface thereof and inclining along the width direction of a vehicle body.

Each of first oblique mounting surfaces 12 may be a surface to which a fixed rail 31 of a sliding rail device 30 is attached, and may incline along the width direction of a vehicle body, downwardly inclining toward the outside direction.

The sliding armrest 20 may be mounted onto the fixed armrest 10 so as to be transferred forward and backward by means of the sliding rail device. The sliding armrest 20 may have one of second oblique mounting surfaces 22 formed on the undersurface thereof and vertically facing the first oblique mounting surfaces 12 of the fixed armrest 10.

Each of second oblique mounting surfaces 22 may be a surface to which a moving rail 32 of the sliding rail device 30 is attached, and may incline along the width direction of a vehicle body, downwardly inclining toward the outside direction similarly to the first oblique mounting surface 12.

In this case, a concave armrest locking mechanism installation space 24 having a U-shaped section may be formed on the top surface of the sliding armrest 20 between the second oblique mounting surfaces 22, i.e., the inner side surfaces of the pair of second oblique mounting surfaces 22. An armrest locking mechanism 26 may be installed in the armrest locking mechanism installation space 24 in order to lock the armrest when the armrest is closed with respect to the console box or to unlock the armrest when the armrest is opened.

An armrest cover member 28 substantially defining the exterior of the armrest and forming the armrest surface capable of supporting the arm of a driver may be disposed over the second oblique mounting surfaces 22 and the sliding armrest 20 installed with the armrest locking mechanism 26.

Here, the sliding rail device 30 may be disposed between the first oblique mounting surface 12 of the fixed armrest 10 and the second oblique mounting surface 22 of the sliding armrest 20 in order to provide a forward and backward sliding force for the sliding armrest 20.

Figure 5A:
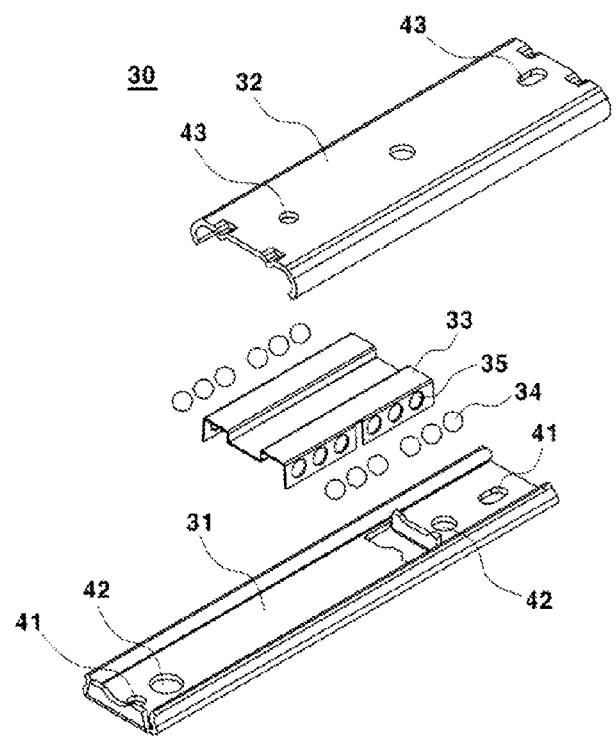
FIG. 5A, FIG. 5B, and FIG. 5C are views illustrating a sliding rail device of the exemplary sliding armrest device according to an embodiment of the present invention.
Figure 5B:
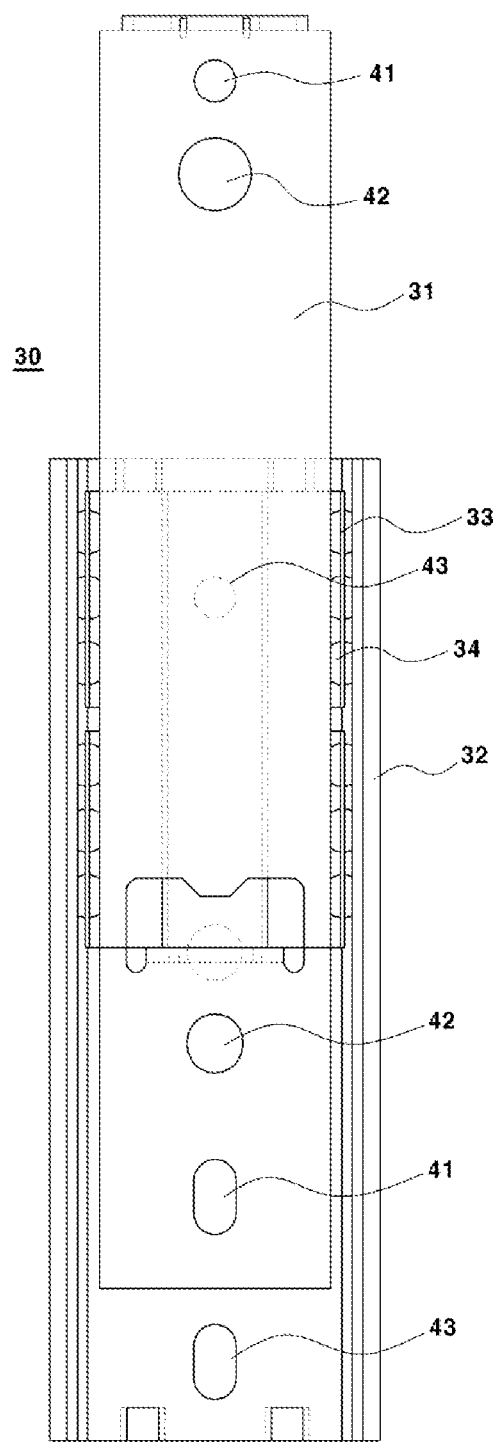

Referring to FIGS. 5A and 5B, the sliding rail device 30 may include the fixed rail 31 fixedly adhered closely to the first oblique mounting surface 12 of the fixed armrest 10, the moving rail 32 fixed to the second oblique mounting surface 22 of the sliding armrest 20 and transferably disposed along the fixed rail 31, bearing ball 34 for forward and backward sliding of the moving rail 32 and a retainer 33 holding the bearing balls 34.

The retainer 33 may have a plurality of ball holding apertures 35 formed in both end portions thereof, and may be disposed between the fixed rail 31 and the moving rail 32. The ball 34 may be penetratively inserted into the ball holding aperture 35 of the retainer 33 and may be disposed between the fixed rail 31 and the moving rail 32 so as to roll therebetween, providing a sliding transfer force for the moving rail with respect to the fixed rail 31.

Figure 5C:
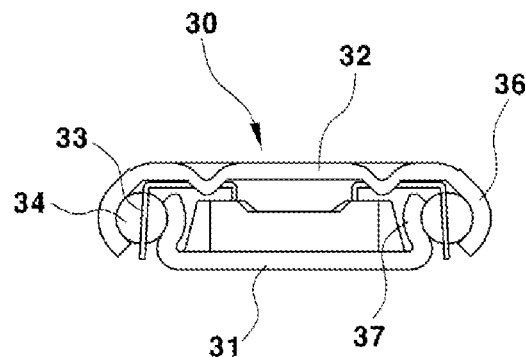

Particularly, as shown in FIG. 5C, the moving rail 32 of the sliding rail device 30 may include an elastic pressurization end 36 integrally formed to be bent at the both side end portions thereof and covering the outer side surface of the ball 34, and the fixed rail 31 may include an elastic support end 37 integrally formed to be bent at the both side end portions thereof and covering the inner side surface of the ball 34. Thus, the ball 34 can be prevented from being separated and can perform a rolling force control function.

In this case, the elastic pressurization end 36 of the moving rail 32 and the elastic support end 37 of the fixed rail 31 may be adjusted in tension, i.e., the degree of bending in order to control the degree of rolling of the ball 34. Thus, the forward and backward sliding force of the moving rail 32 with respect to the fixed rail 31 may be adjusted.

Hereinafter, a method of assembling the sliding rail device 30 will be described in detail.

The sliding rail device 30 may include, as one assembly, the fixed rail 31, the moving rail 32, the retainer 33, and the balls 34. Accordingly, a separate assembly structure may be needed in order to easily mount the sliding rail device 30 between the first oblique mounting surface 12 of the fixed armrest 10 and the second oblique mounting surface 22 of the sliding armrest 20.

For this, in order to fix the fixed rail 31 of the sliding rail device 30 to the first oblique mounting surface 12 of the fixed armrest 10 with screws, first assembly apertures 41 for screw coupling may be formed in the fixed rail 31 and the first oblique mounting surface 12 so as to match each other.

Also, in order to fix the moving rail 32 of the sliding rail device 30 to the second oblique mounting surface 22 of the sliding armrest 20 with screws, tool insertion apertures 42 may be penetratively formed in the first oblique mounting surface 12 and the fixed rail 31 such that a tool can be inserted into the tool insertion apertures 42 from the undersurface of the fixed armrest 10, and second assembly apertures 43 for screw coupling may be penetratively formed in the moving rail 32 and the second oblique mounting surface 22 so as to match the tool insertion apertures 42.

Figure 6A:
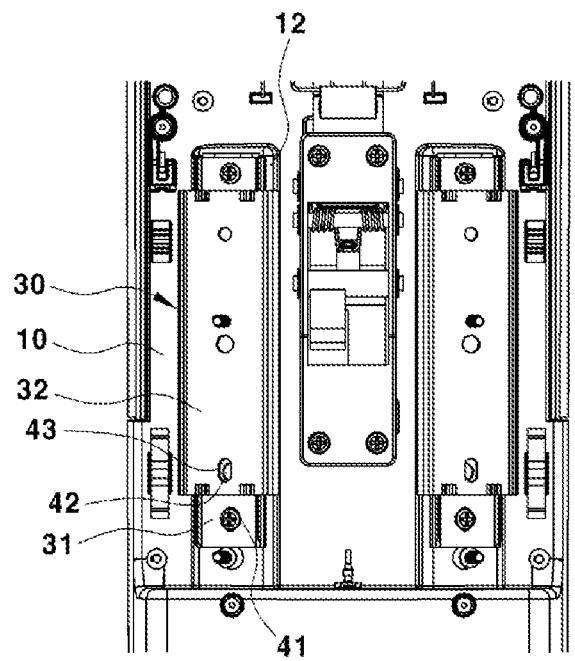
FIG. 6A and FIG. 6B are a top view and a bottom view illustrating a method of assembling a sliding rail device of the exemplary sliding armrest device according to the present invention.

First, as shown in the top view, FIG. 6A, the fixed rail 31 of the sliding rail device 30 may be adhered closely to the first oblique mounting surface 12 of the fixed armrest 10, and then screws may be inserted into and coupled to the first assembly apertures 41 formed in the fixed rail 31 and the first oblique mounting surface 12 so as to match each other. Thus, the fixed rail 31 of the sliding rail device 30 may be fixedly coupled to the first oblique mounting surface 12 of the fixed armrest 10.

In this case, as the sliding rail device 30 is provided as one assembly, the moving rail 32 may be maintained so as to be slidably attached to the fixed rail 31.

Figure 6B:
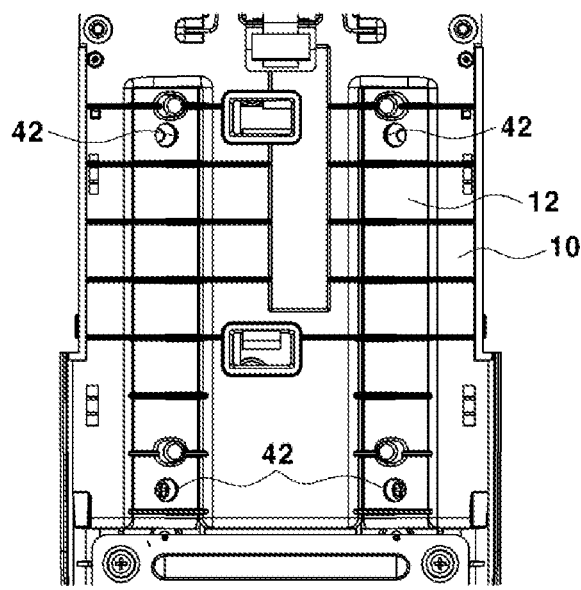

Next, as shown in the bottom view, FIG. 6B, a tool may be inserted into the tool insertion aperture 42 exposed through the undersurface of the fixed armrest 10, i.e., the tool insertion aperture 42 penetratively formed in the first oblique mounting surface 12 and the fixed rail 31, and then, screws may be coupled to the second assembly apertures 43 for screw coupling, which are formed in the moving rail 32 and the second oblique mounting surface 22 of the moving rail 20 so as to match each other. Thus, the moving rail 22 of the sliding rail device 30 may be fixedly coupled to the second oblique mounting surface 22 of the sliding armrest 20.

Finally, the second oblique mounting surface 22 of the sliding armrest 20 may be coupled to the first oblique mounting surface 12 of the fixed armrest 10 across the sliding rail device 30 so as to be transferred forward and backward.

Accordingly, when a driver or a passenger pulls the sliding armrest to a front location corresponding to his/her body condition, the sliding armrest 20 may slide forward in accordance with the rolling guide of the sliding rail device 30, and a driver or a passenger can comfortably place his/her arm on the sliding rail device.

In this case, as described above, the forward and backward sliding force of the moving rail 32 and the sliding armrest 20 can be adjusted by controlling the rolling degree of the balls 34 through the tension adjustment of the elastic pressurization end 36 of the moving rail 32 and the elastic support end 37 of the fixed rail 31.

Thus, unlike a related-art in which the rail structure of the sliding armrest is protrusively disposed at both side end portions of the armrest, causing the left-to-right width of the armrest to increase, since one pair of sliding rail devices 30 are disposed between the first oblique mounting surface 12 of the fixed armrest 10 and the second oblique mounting surface 22 of the sliding armrest 20, the overall width of the armrest can be reduced, and a separate layout space can be provided as much as the size is reduced.

Figure 7:
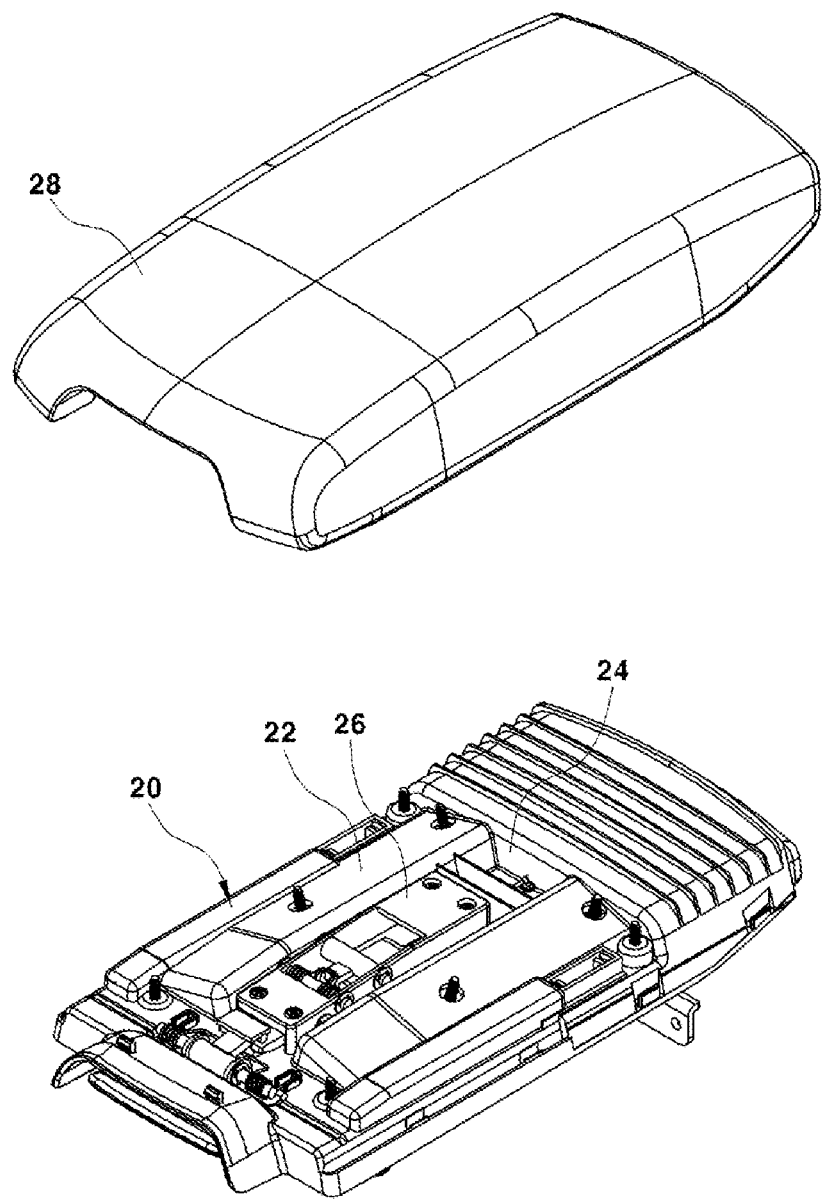
FIG. 7 is a perspective view illustrating the exterior of the exemplary sliding armrest of a sliding armrest device according to the present invention.

On the other hand, referring to FIG. 7 which shows the top surface of the sliding armrest 20 by separating the armrest cover member 28, the concave armrest locking mechanism installation space 24 having a U-shaped section in which the armrest locking mechanism 26 is installed may be formed between the inner side surfaces of the second oblique mounting surfaces 22 of the sliding armrest 20, thereby making the layout more advantageous.

The present invention provides the following effects.

First, a floating phenomenon in up-and-down and left-and-right directions can be prevented during the movement of the sliding armrest, and thus the emotional quality can be improved during the operation, by including a fixed armrest and a sliding armrest, mounting a pair of sliding rail devices between the fixed armrest and the sliding armrest in an oblique form along the width direction of a vehicle body, and allowing the sliding armrest to be seated on the fixed armrest like a concave-convex structure.

Second, as ball bearings are included in the sliding rail device mounted between the fixed armrest and the sliding armrest, a frictional force can be reduced by point-contact rolling of the ball bearings during the transfer of the sliding armrest.

Third, unlike a related-art in which a rail structure is disposed at both end portions of an armrest, since one pair of sliding rail devices are located between the top surface of the fixed armrest and the undersurface of the sliding armrest, the whole width of the armrest can be reduced, and an armrest locking mechanism installation space can be secured between the respective sliding rail devices.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding armrest device for a vehicle, comprising:
   a fixed armrest having a first oblique mounting surface formed on a top surface thereof and inclining along a width direction of a vehicle body;
   a sliding armrest having a second oblique mounting surface formed on an undersurface thereof and vertically matching the first oblique mounting surface; and a sliding rail device disposed between the first oblique mounting surface of the fixed armrest and the second oblique mounting surface of the sliding armrest and providing a forward and backward sliding force for the sliding armrest, wherein the sliding rail device comprises:

a fixed rail closely and fixedly mounted onto the first oblique mounting surface of the fixed armrest; and a moving rail fixedly mounted onto the second oblique mounting surface of the sliding armrest and simultaneously attached slidably to the fixed rail.

2. The sliding armrest device of claim 1, wherein the sliding rail device further comprises:

a retainer disposed between the fixed rail and the moving rail and having a plurality of ball holding apertures formed in both end portions thereof; and a plurality of balls penetratively inserted into the ball holding apertures of the retainer and simultaneously disposed to roll between the fixed rail and the moving rail so as to provide a sliding transfer force for the moving rail with respect to the fixed rail.

3. The sliding armrest device of claim 1, wherein the moving rail comprises an elastic pressurization end bent at both end portions thereof and covering an outer side surface of the ball.

4. The sliding armrest device of claim 1, wherein the fixed rail comprises an elastic support end bent at both end portions thereof and covering an inner side surface of the ball.

5. The sliding armrest device of claim 1, wherein in order to fix the fixed rail of the sliding rail device to the first oblique mounting surface of the fixed armrest, first assembly apertures for screw coupling are formed in the fixed rail and the first oblique mounting surface.

6. The sliding armrest device of claim 1, wherein in order to fix the moving rail of the sliding rail device to the second oblique mounting surface of the sliding armrest, a tool insertion aperture is penetratively formed in the first oblique mounting surface and the fixed rail such that a tool is inserted into the tool insertion aperture from an undersurface of the fixed armrest, and a second assembly aperture for screw coupling is formed in the moving rail and the second oblique mounting surface so as to match the tool insertion aperture.

7. The sliding armrest device of claim 1, further comprising an armrest cover member disposed over the sliding armrest and forming an armrest surface.

8. The sliding armrest device of claim 1, wherein in order to fix the fixed rail of the sliding rail device to the first oblique mounting surface of the fixed armrest, first assembly apertures for screw coupling are formed in the fixed rail and the first oblique mounting surface.

9. The sliding armrest device of claim 1, wherein in order to fix the moving rail of the sliding rail device to the second oblique mounting surface of the sliding armrest, a tool insertion aperture is penetratively formed in the first oblique mounting surface and the fixed rail such that a tool is inserted into the tool insertion aperture from an undersurface of the fixed armrest, and a second assembly aperture for screw coupling is formed in the moving rail and the second oblique mounting surface so as to match the tool insertion aperture.

10. The sliding armrest device of claim 1, wherein the sliding armrest has a U-shaped section formed between inner side surfaces of the second oblique mounting surfaces of the sliding armrest.

\* \* \* \* \*